(12) United States Patent
Chang et al.

(10) Patent No.: US 7,660,436 B2
(45) Date of Patent: Feb. 9, 2010

(54) STEREO-VISION BASED IMMINENT COLLISION DETECTION

(75) Inventors: Peng Chang, Pittsburgh, PA (US); Theodore Armand Camus, Mount Laurel, NJ (US)

(73) Assignees: Sarnoff Corporation, Princeton, NJ (US); Autoliv Electronics, Auburn, MI (US)

( * ) Notice: Subject to any disclaimer, the term of this patent is extended or adjusted under 35 U.S.C. 154(b) by 0 days.

(21) Appl. No.: 10/766,976

(22) Filed: Jan. 29, 2004

(65) Prior Publication Data

US 2004/0252863 A1 Dec. 16, 2004

Related U.S. Application Data

(63) Continuation-in-part of application No. 10/461,699, filed on Jun. 13, 2003.

(60) Provisional application No. 60/484,463, filed on Jul. 2, 2003.

(51) Int. Cl.
 *G06K 9/00* (2006.01)
(52) U.S. Cl. .................................... 382/104
(58) Field of Classification Search ............... 382/104, 382/199, 281, 291, 189; 701/65, 208, 209, 701/300–302; 340/931, 932, 961
See application file for complete search history.

(56) References Cited

U.S. PATENT DOCUMENTS

| 6,049,756 | A  | * | 4/2000  | Libby ........................ 701/301 |
| 6,151,539 | A  | * | 11/2000 | Bergholz et al. ............... 701/25 |
| 6,675,094 | B2 | * | 1/2004  | Russell et al. ............... 701/301 |
| 7,113,635 | B2 | * | 9/2006  | Robert et al. ............... 382/154 |
| 7,139,423 | B1 | * | 11/2006 | Nicolas et al. ............... 382/154 |
| 2004/0252862 | A1 |  | 12/2004 | Camus et al. |

FOREIGN PATENT DOCUMENTS

EP     1030188     8/2000

OTHER PUBLICATIONS

Christopher E. Smith. Application of the Controlled Active Vision Framework to Robotic and Transportation Problems. I.E.E.E. 1994, pp. 213-220.*

Keiji Saneyoshi. Drive Assist System Using Stereo Image Recognition. I.E.E.E. Jun. 1996.*

Scott-D-A. Stereo-vision framework for autonomous vehicle guidance and collision avoidance. Proceedings-of-the-SPIE-The-International-Society-for-Optical-Engineering, vol. 5084, p. 100-8, 2003.*

(Continued)

*Primary Examiner*—Brian Q Le
(74) *Attorney, Agent, or Firm*—Lowenstein Sandler PC (57) ABSTRACT

A stereo vision based collision avoidance systems having stereo cameras that produce imagery that is processed to produce a depth map of a scene. A potential threat is detected in the depth map. The size, position, and velocity of the detected potential threat are then estimated, and a trajectory analysis of the detected potential threat is determined using the estimated position and the estimated velocity. A collision prediction based on the trajectory analysis is determined, and then a determination is made as to whether a collision is imminent based on the collision prediction and on the estimated size of the potential threat.

30 Claims, 5 Drawing Sheets

OTHER PUBLICATIONS

Ming, Yang. Vision-based Real-time Obstacles Detection and Tracking for Autonomous Vehicle Guidance. Prcoceeding of SPIE vol. 4666, 2002.*

Hiroshi, Koyasu. Realtime Omnidirectional Stereo for Obstacle Detection and Tracking in Dynamic Environments. I.E.E.E. International Conference on Intelligent Robots and Systems, Oct. 2001, pp. 31-36.*

R. Mandelbaum. Vision for Autonomous Mobility: Image Processing on the VFE-200. I.E.E.E. Sep. 1998, pp. 671-676.*

C. Knoeppel. Robust Vehicle Detection at Large Distance Using Low Resolution Cameras. I.E.E.E Intelligent Vehicles Symposion 2000, pp. 267-272.*

Uwe Franke. Autonomous Driving Goes Downtown. I.E.E.E Intelligent Systems, 1998, pp. 40-48.*

Moriy-T. Stereo-based collision avoidance system for urban traffic. SPIE Applications of Digital Image processing Jul. 2002, vol. 4790, pp. 417-424.*

Kang, S. et al.: "Real-Time Pedestrian Detection Using Support Vector Machines" International Journal of Pattern Recognition and Artificial Intelligence, World Scientific Publishing, Singapore, SI, vol. 17 No. 3, May 1, 2003, pp. 405-416.

Se, S. et al.: "Ground plan estimation, Error Analysis and Applications" Robotics and Autonomous Systems, Elsevier Science Publishers, Amsterdam, NL, vol. 39, No. 2, May 31, 2002, pp. 59-71.

Tsuji, S. et al. Stereo Vision of a Mobile Robot: World Constraints for Image Matching and Interpretation: Department of Control Engineering, Proceedings 1986 IEEEE International Conference on Robotics and Automation Apr. 7-10, 1986, San Francisco, CA. Comput. Soc. PR, Apr. 7, 1986 pp. 1594-1599.

Leung, M. K. et al. Detecting Wheels of Vehicle in Stereo Images; Proceedings of International Conferenced on Pattern Recognition, Atlantic City, NJ, 1990. vol. i, Jun. 16, 1990, pp. 263-267.

* cited by examiner

STEREO-VISION BASED IMMINENT COLLISION DETECTION

CROSS-REFERENCE TO RELATED APPLICATIONS

This application claims the benefit of U.S. provisional patent application No. 60/484,463, filed Jul. 2, 2003, entitled, "Stereo Vision Based Algorithms for Automotive Imminent Collision Avoidance," by Chang et al., which is herein incorporated by reference.

This application is a continuation-in-part of pending U.S. patent application Ser. No. 10/461,699, filed on Jun. 13, 2003, entitled, "VEHICULAR VISION SYSTEM", by Camus et al. That Patent application is hereby incorporated by reference in its entirety.

BACKGROUND OF THE INVENTION

1. Field of the Invention

The present invention relates to vision systems, e.g., as deployed on a vehicle. In particular, this invention relates to detecting imminent collisions using stereo vision.

2. Description of the Related Art

Significant interest exists in the automotive industry for systems that detect imminent collisions in time to avoid that collision or to mitigate its damage. Collision avoidance systems typically must detect the presence of potential threats, determine their speed and trajectory, and assess their collision threat. Prior art collision avoidance systems have used radar to determine the range and closing speed of potential threats. However, affordable radar systems usually lack the required spatial resolution to reliably and accurately determine the size and the location of potential threats.

Since stereo vision can provide the high spatial resolution required to identify potential threats, stereo vision has been proposed for use in collision detection and avoidance systems. For example, U.S. patent application Ser. No. 10/461,699, filed on Jun. 13, 2003 and entitled "VEHICULAR VISION SYSTEM," which is hereby incorporated by reference in its entirety, discloses detecting and classifying objects (potential threats) using disparity images, depth maps, and template matching. While the teachings of U.S. patent application Ser. No. 10/461,699 are highly useful, its methods of detecting potential threats are not optimal in all applications.

Therefore, there is a need in the art for new techniques of using stereo vision for collision detection and avoidance.

SUMMARY OF THE INVENTION

In one embodiment the principles of the present invention provide for stereo vision-based collision detection.

In one embodiment, a stereo vision based collision avoidance systems that is in accord with the present invention includes stereo cameras that produce imagery that is processed to detect vehicles within a field of view. Such processing includes determining the size, speed and direction of potential threats and an assessment of the collision threat posed by the detected potential threats.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

A primary requirement of a collision avoidance system is the detection of actual collision threats to a platform, e.g., a host vehicle. Once an imminent collision is detected the host vehicle (platform) may take action either to avoid the collision and/or to mitigate the damage caused by the collision. Information regarding the size, location, and motion of a potential threat is useful in determining if a specific measure that could be taken is appropriate under the given conditions.

A collision detection system that is in accord with the principles of the present invention estimates the location and motion of potential threats, determines various properties of those threats, such as size, height, and width, and classifies the potential threats to identify imminent collisions based upon the previously estimated location, motion, and properties. Since collision detection often involves vehicles traveling at high speed, a collision detection system that is in accord with the principles of the present invention incorporates efficiently executed algorithms that are sufficiently robust to accommodate a wide range of potential threats, lighting conditions, and other circumstances.

Figure 1:
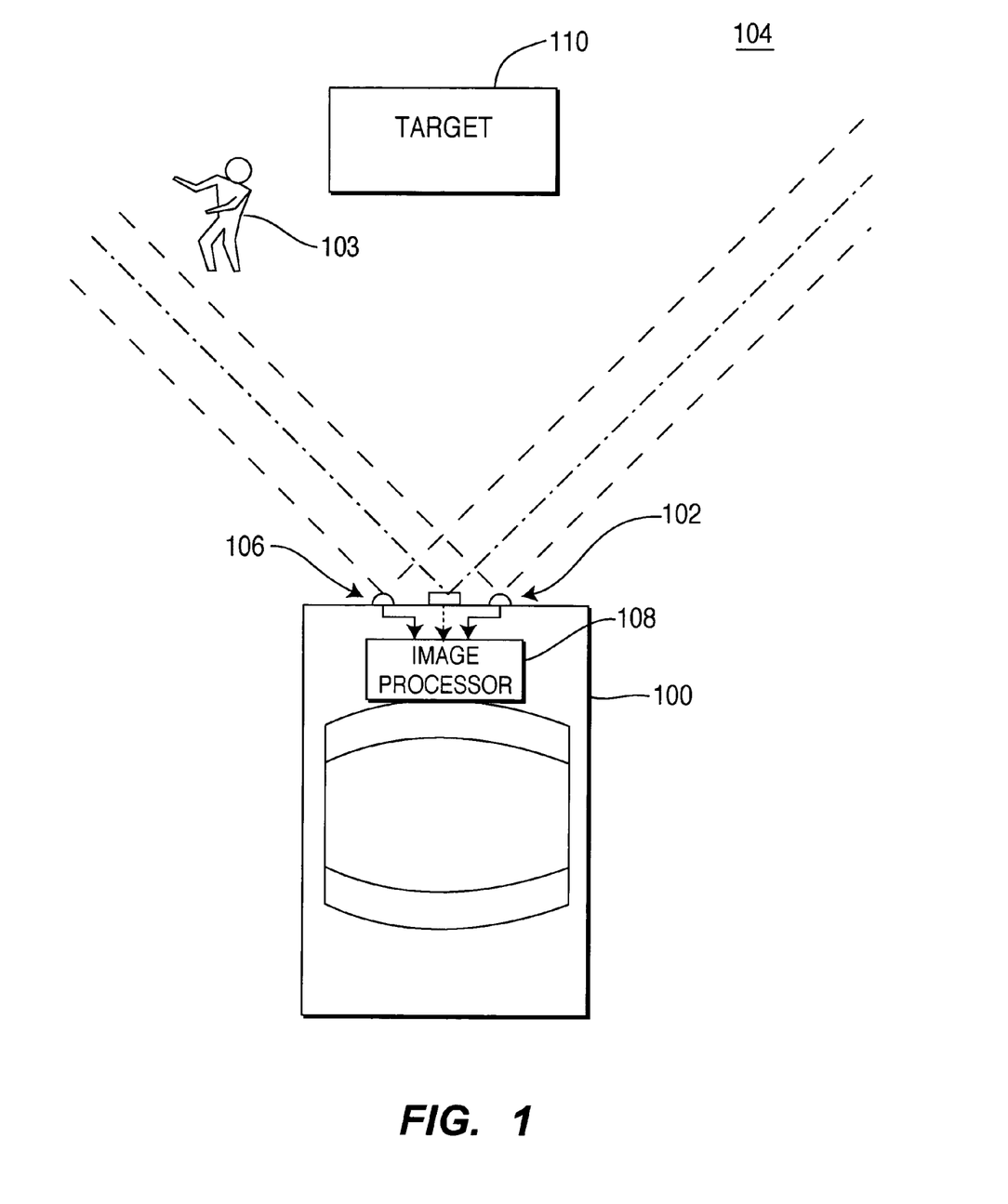
FIG. 1 depicts a schematic view of a vehicle having a stereo vision system that is in accord with the principles of the present invention.

FIG. 1 depicts a schematic diagram of a host vehicle 100 having a collision detection system 102 that is in accord with the principles of the present invention. That system detects potential threats within a scene 104 that is proximate the vehicle 100. That scene may include non-threatening objects such as a pedestrian 103 as well as potential threats, shown in FIG. 1 as a vehicle 110. While FIG. 1 shows the scene 104 in front of the host vehicle 100, other collision detection systems may image scenes that are behind or to the side of the host vehicle 100. The collision detection system 102 uses a stereo vision imaging device 106 that is coupled to an image processor 108. The stereo vision imaging device 106 has a field of view that includes the pedestrian 103 and the vehicle 110.

Figure 2:
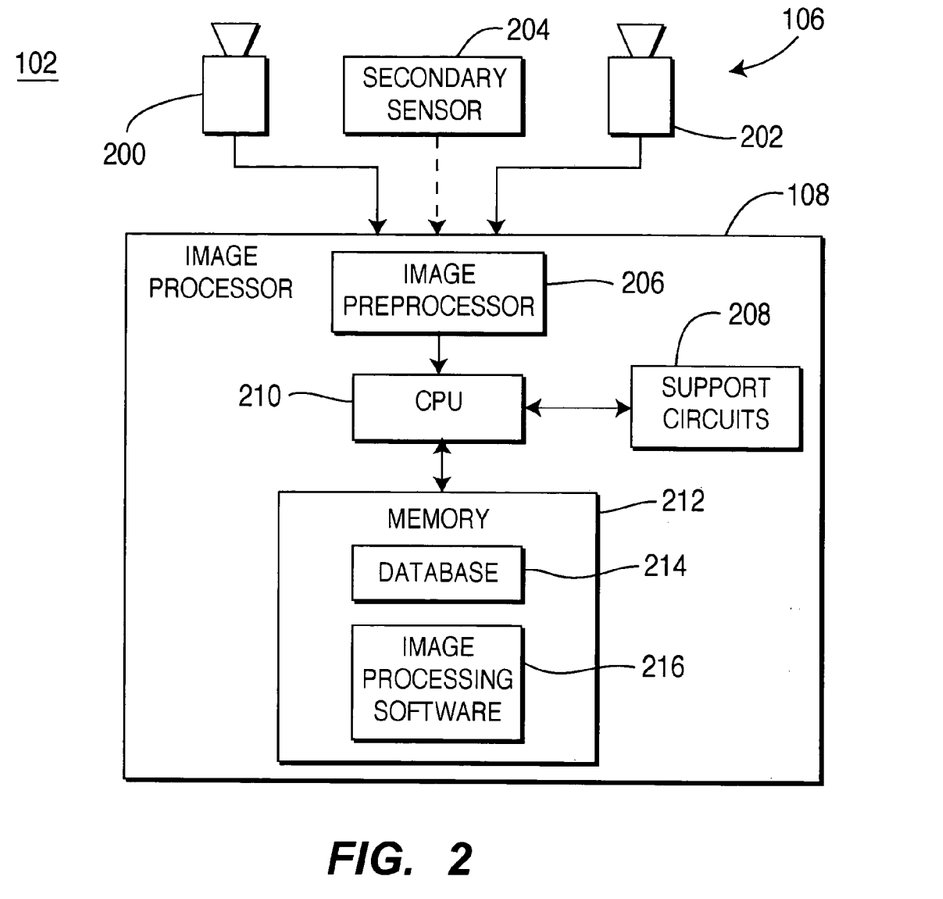
FIG. 2 illustrates electronic subsystems of the stereo vision system of FIG. 1.

FIG. 2 depicts a block diagram of hardware used to implement the collision detection system 102. The stereo vision imaging device 106 comprises a pair of cameras 200 and 202 that operate in the visible wavelengths. The cameras have a known relation to one another such that they can produce a stereo image of the scene 104 from which information can be derived. The image processor 108 comprises an image preprocessor 206, a central processing unit (CPU) 210, support circuits 208, and memory 217. The image preprocessor 206 generally comprises circuitry for capturing, digitizing and processing the stereo imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. The CPU 210 is supported by support circuits 208 that are generally well known in the art. These circuits include cache, power supplies, clock circuits, input-output circuitry, and the like. The memory 217 is also coupled to the CPU 210. The memory 217 stores certain software routines that are executed by the CPU 210 and by the image preprocessor 206 to facilitate the operation of the invention. The memory also stores certain databases 214 of information that are used by the invention, and image processing software 216 that is used to process the imagery from the sensor array 106. Although the invention is described in the context of a series of method steps, the method may be performed in hardware, software, or some combination of hardware and software.

Figure 3:
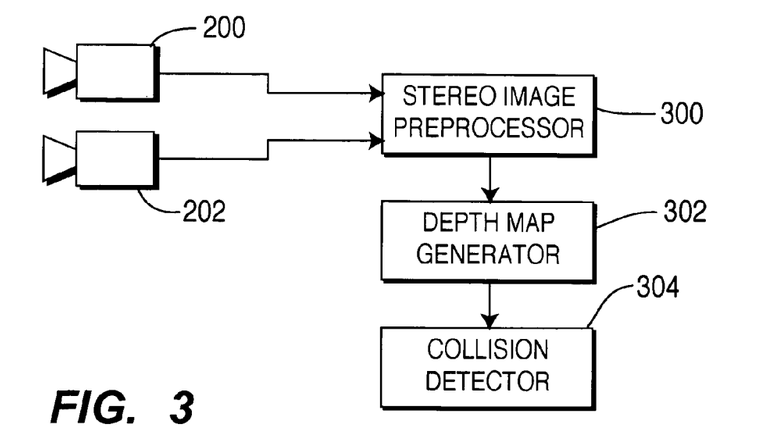
FIG. 3 depicts producing a depth map.

FIG. 3 is a block diagram of functional modules that determine if a collision is imminent. The cameras 200 and 202 provide stereo imagery for a stereo image preprocessor 300. The stereo image preprocessor 300 calibrates the cameras 200 and 202, captures and digitizes stereo imagery, warps the images into alignment, and performs a pyramid wavelet decomposition to create multi-resolution disparity images. Camera calibration is important as it provides a reference point and a reference direction from which all distances and angles are determined. In particular, the separation of the cameras is important since the disparity images contain the point-wise motion from the left image to the right image. The greater the computed disparity of a potential threat, the closer that threat is to the cameras 200 and 202. After preprocessing, a depth map generator 302 produces a depth map. The depth map contains data representative of the image points, where each point represents a specific distance from the cameras 200 and 202 to a point within the scene 104. The depth map is used by a collision detector 304 that detects whether a collision is imminent using the processes that are described below.

Figure 4:
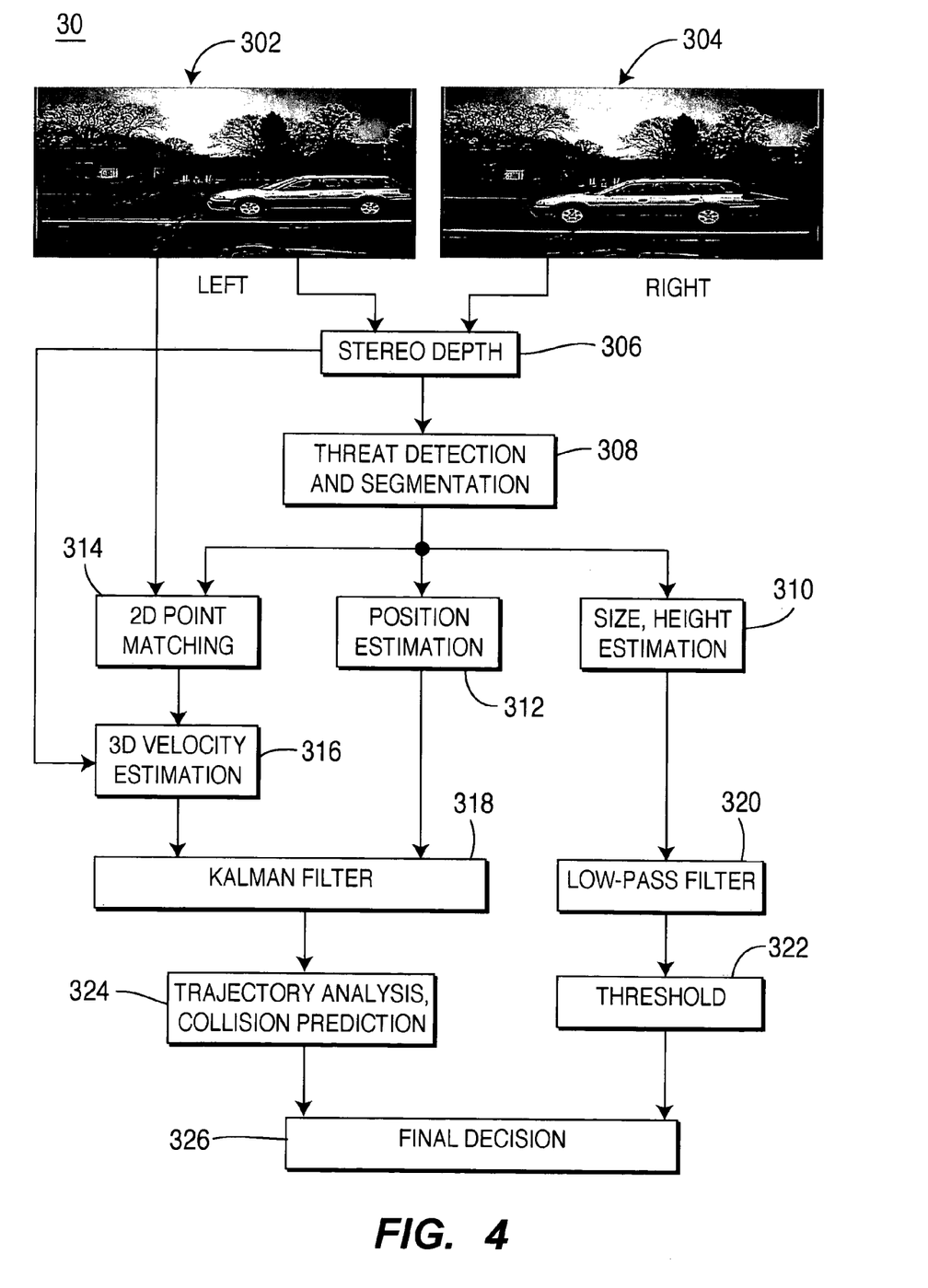
FIG. 4 depicts a flow chart of a potential threat detection and segmentation process used in the vision system of FIG. 2.

FIG. 4 depicts a flow diagram of the operation of the collision detection system 102. At steps 302 and 304 the stereo cameras 200 and 202 provide left and right image stream inputs that are processed at step 306 to form the stereo depth map using the method described with reference to FIG. 3. With the stereo depth data available, at step 308 a threat detection and segmentation algorithm detects potential threats in the stereo depth data, and thus in the scene 104 (see FIG. 1). The threat detection and segmentation step 308 returns "bounding boxes" of potential threats in the stereo depth data. The threat detection and segmentation algorithm used in step 308 is described in more detail subsequently.

Once bounding boxes are obtained, the properties of the potential threats can be obtained from the stereo depth data. At step 310 the size and height of the potential threats are determined; at step 312 the relative position of the potential threats are determined; and at steps 314 and 316 a velocity estimation algorithm is performed that provides velocity estimates for the potential threats. The details of determining those properties are described subsequently.

All of the properties determined in steps 310, 312, and 314-316 are estimates that are derived from the stereo depth data, which includes image noise. To reduce the impact of that noise, those property estimates are time filtered. More specifically, at step 318 the position and velocity measurements are filtered using Kalman filters, while at step 320 a low-pass filter filters noise from the other estimates. More details of filtering are provided subsequently. After low pass filtering, at step 322 the low pass filtered estimates are threshold detected. Threshold detection removes small and large objects from the potential threat list.

Once filtered size, position, and velocity estimates are known, at step 324 the collision avoidance system 102 performs a trajectory analysis and a collision prediction of the potential threats. That analysis, combined with the threshold determination from step 322, is used at step 326 to make a final decision as to whether an imminent collision with a potential threat is likely.

Figure 5:
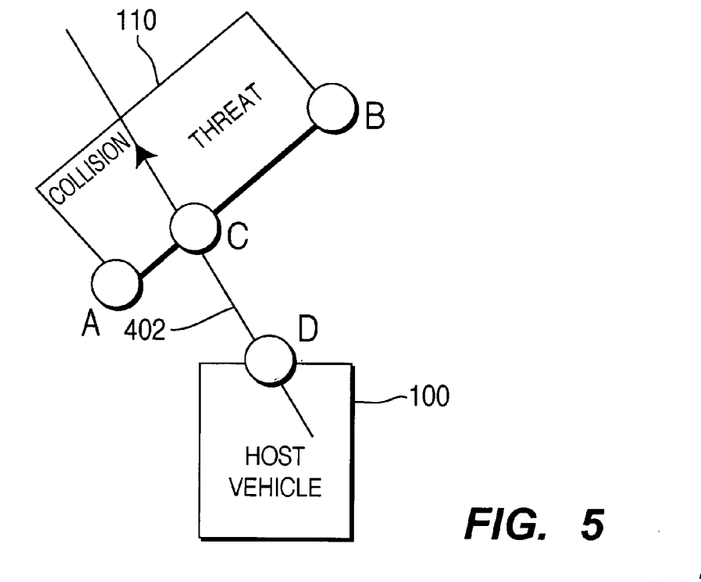
FIG. 5 depicts a top view of an imminent collision.

FIG. 5 depicts a top view of a collision scenario in which a host vehicle 100 has identified a potential threat 110 as an imminent collision threat. A closing path 402 is represented by the line C-D, where C and D respectively represent the collision contact points of the potential threat 110 and the host vehicle 100. Points A and B represent the edges of the potential threat 110, which are determined in steps 310 and 320. The position of C can be computed once the positions of point A, B, D and the lateral and longitudinal velocities are known.

Turning back to step 308, threat detection and segmentation, that step is performed using a process (depicted in FIG. 6) that processes the stereo depth map computed in step 306. Threat detection and segmentation is based on the principle that each pixel in the stereo depth map has an associated 3D position from which objects can be abstracted. However, the stereo depth map is often noisy and sparse. The flowchart depicted in FIG. 6 starts with the stereo depth map data obtained at step 306. At step 602 that data is tessellated into a grid of patches. At step 604, for each patch a plane is fitted (in a manner that is subsequently explained) through data points within the specific patch, and then each patch is classified into predefined types. Those predefined types are based on the 3D positions of each patch and on the normal vector of the fitted plane. Broadly, the predefined types are of three general classes, those that are likely to represent a potential threat; those that possibly may represent a potential threat; and those that are unlikely to represent a potential threat. Step 604 is explained in more detail subsequently.

Figure 6:
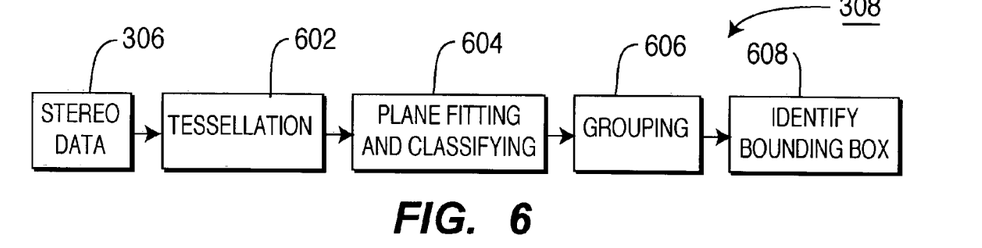
FIG. 6 depicts a flow chart of a plane fitting and labeling process used in the potential threat detection and segmentation process of FIG. 4.

Still referring to FIG. 6, at step 606 a grouping process groups the patches together based on their classifications. To reduce the effect of confusion patches (a classification type that is described subsequently), the grouping process performs two groupings. In the first grouping the patches classified as car sides and car tops (see below) are grouped together. Those patches cover the potential threats. After the first grouping a second grouping adds confusion patches (additional patches usually at the boundary of the threat car) to the potential threats, if any exist. After grouping, at step 608 the classified patches are clustered to form bounding boxes. It should be noted that the second grouping of step 606 improves the clustering of the bounding boxes at potential threat boundaries.

Figure 7:
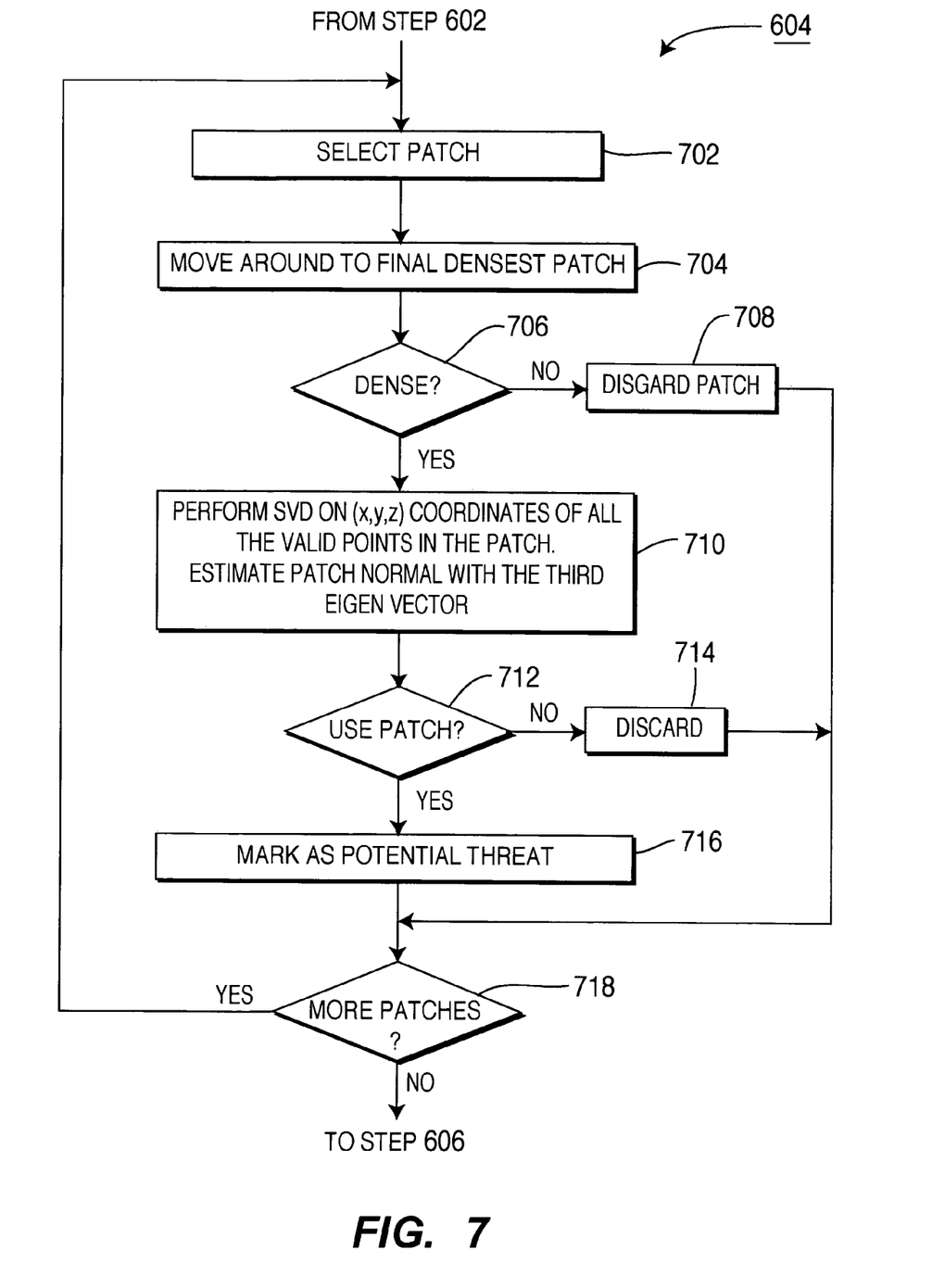
FIG. 7 depicts a flow chart of a velocity estimation process used in the vision system of FIG. 3.

FIG. 7 illustrates the step 604 of plane fitting and patch classifying in more detail. Plane fitting is used to generate plane normals, which are important in the classification of the patches. At step 702 a patch is selected. Then, to mitigate problems caused by data insufficiency within the stereo data, at step 704 the patch is moved around locally to find the region of maximum stereo density near the original patch location. This reduces the effect of holes in the stereo data that cause problems such as increased errors when plane fitting. Holes, which represent pixels that do not have valid 3D position estimates, are caused by specularities, lack of texture, or other factors in the stereo image data. The 3D positions of the pixels can also contain noise and outliers, sometimes severe, which can also cause problems. Readily identifiable noise and outliers can also be removed from the stereo data. Then, at step 706 a determination is made as to whether the patch is dense enough to be used. If not, at step 708 a patch without sufficient density is discarded. Thus, not all patches are used in the collision avoidance system 102.

Still referring to FIG. 7, at step 710, for each patch that is retained a subset of the stereo image data points for that patch is used for plane fitting and patch normal determination. For example, only pixels having depth values in the middle 80% of the overall range can be used. This eliminates possible outliers in the stereo data from skewing the results. Plane fitting starts by removing each patch's distance offset from the stereo data. This forces the resulting patch plane to be such that the 3D position (x, y, z) of any point in the plane satisfies the equation ax+by+cz=0, which is the desired plane equation having an origin at the patch center. Then, a plane is fit through the selected subset 3D points of each patch to form the desired patch plane. The resulting patch plane is such that for all points:

$$Ax=0$$

where x=(a, b, c) is the plane normal, and A is an N by 3 matrix with the 3-D coordinates with respect to the patch centroid, (x,y,z), for each point at every row. A least square solution of Ax=0 provides the patch's, (surface) normal vector. A computationally efficient way to calculate the surface normal vector is to calculate the third Eigen-vector of the matrix $A^TA$, by applying a singular valued decomposition (SVD) to the matrix $A^TA$. Fast SVD algorithms exist for positive semi-definite matrixes, which is the case for the matrix of interest.

Once the plane normal is available, at step 712 a decision is made as to whether to use the patch in collision detection. That decision is based on the classification of the patch, with the patch being classified as one of the following types:

a negative patch, if the patch has a negative height;

a ground patch, if the patch height is both below a threshold and has a vertical normal;

a faraway patch, if the patch distance is outside the scope of interest a high patch, if the patch height is outside the scope of interest a boundary patch, if the height is close to ground but has a non-vertical normal, or if the height is above the threshold but has a vertical normal;

a car side patch, if the height is above the threshold and has a non-vertical normal; or a car top patch, if the height is above the threshold and with an almost vertical normal.

Patch classification is based on the orientation of the patch (as determined by its plane normal), on its height constraint, and on it position. Classifying using multiple criteria helps mitigate the impact of noise in the stereo image data. The exact thresholds to use when classifying depend on the calibration parameters of the cameras 200 and 202 and on the potential threats in the scene 104. In most cases the patches that are classified as car sides or car tops are, in fact, from a potential threat. Thus, the car side and car top classifications represent a general class of being from a potential threat. The confusion patches are often boundary patches which contain mixed parts of ground and a potential threat. Thus, confusion patches represent a general class that may represent a potential threat. If the patch is not classified as a car side, car top, or confusion patch the patch is unlikely to be from a potential threat and are thus discarded in step 714. However, if the patch is a car side, car top, or confusion patch, at step 716 the patch is marked as being part of a potential threat. Finally, after step 716, 714, or step 708, at step 718 a decision is made as to whether there are any more patches to classify. If yes, step 604 returns to select another patch at step 702. Otherwise, the method 300 proceeds to step 606.

The height, size and locations of potential threats can be measured directly from the bounding box. In particular, the left and right bounds of potential threats are determined over time to enable better estimates.

Figure 8:
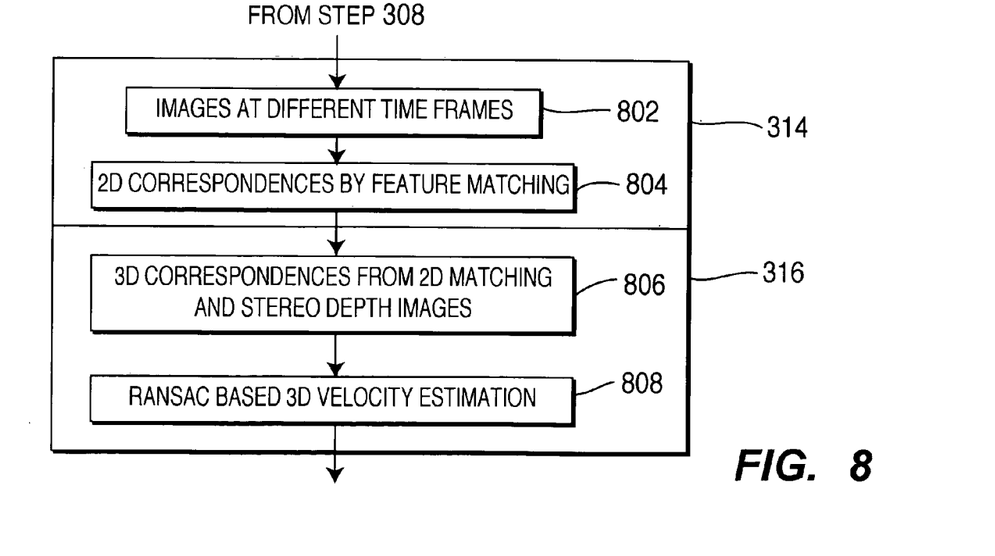
FIG. 8 depicts a flow chart for performing velocity estimation.

FIG. 8 illustrates the methods of steps 314 and 316, velocity estimation, in more detail. After the bounding boxes in step 308 has been found the velocity of the potential threats can be estimated. First, at step 802 images of the scene 104 are obtained in different time frames. This is also shown by line 313 of FIG. 4. Then, at step 804 2D correspondences for selected potential threats are determined using "feature matching" in the different time frames to establish 2D correspondences across time. Reference, D. Nister, "Five point structure from motion algorithm" Sarnoff Corporation, Invention Disclosure 14831. From the 2D correspondences alone the angular velocity of the potential threats can be determined.

Once the 2D correspondences are available, at step 806 the 3D correspondences for the same feature set can be found relatively easily using the depth changes for the same set of features in different frames. This produces two sets of data point sets, $P_i$ and $Q_i$, wherein i=1 ... N and such that:

$$Q_i = R P_i + T + V_i,$$

where N is the number of data points, R is a rotation matrix, T is a 3D translation matrix, and $V_i$ is noise.

Given two corresponding data point sets, at step 808 a 3D velocity estimate is obtained. Standard methods exist to solve for optimal rotation and translation motion if N is greater than two, see, for example, K. Arun, T. Huang, and S. Blostein, "Least-square Fitting of Two 3D Point Sets," IEEE Trans. Pattern Anal. Machine Intel., vol. 9, no. 5, pp. 698 (1987). For automotive collision avoidance it is often beneficial to assume pure translation motion. Then only translation motion needs to be estimated. However, a straight forward implementation of the method taught by K. Arun, T. Huang, and S. Blostein, leads to somewhat inferior results due to the existence of severe noise and outliers in the 3D correspondence data. Thus, step 808 uses a more robust method of estimating velocity based on Random Sample Consensus (RANSAC). The general algorithm is:

1. Select k points from the 3D correspondence data sets:
2. Solve for T (and optionally, R):
3. Find how many points (out of N) fit within a tolerance, call it M.
4. If M/N is large enough, accept the result and exit; otherwise
5. Repeat 1 to 4 L times or until M/N is large enough;
6. Fail It is possible to directly derive the 3D correspondences from the depth images using algorithms such as ICP (Iterative Closest Points). But, directly deriving 3D correspondences is computationally inefficient and is subject to noise in the stereo image data. The 3D correspondences provide the closing velocities of the potential threats relative to the host vehicle 100.

As noted above, to reduce the noise in the stereo data filtering is applied to all measurements. Measurements of constant quantities, such as potential threat size and height, are filtered using standard low pass filtering. Varying parameters, such as position and velocity measurements, are filtered using a Kalman filter. A system model is required by Kalman filter and a constant velocity model is used with an acceleration modeled as Gaussian white noise. The system motion equation may be written as:

$$\begin{bmatrix} X_l \\ Z_l \\ X_r \\ Z_r \\ V_x \\ V_z \end{bmatrix}_{k+1} = \begin{bmatrix} 1 & 0 & 0 & 0 & 1 & 0 \\ 0 & 1 & 0 & 0 & 0 & 1 \\ 0 & 0 & 1 & 0 & 1 & 0 \\ 0 & 0 & 0 & 1 & 0 & 1 \\ 0 & 0 & 0 & 0 & 1 & 0 \\ 0 & 0 & 0 & 0 & 0 & 1 \end{bmatrix} \begin{bmatrix} X_l \\ Z_l \\ X_r \\ Z_r \\ V_x \\ V_z \end{bmatrix}_k + \begin{bmatrix} 0 \\ 0 \\ 0 \\ 0 \\ n_x \\ n_z \end{bmatrix}_k$$

All of the variables are directly measurable (except as explained below), therefore the observation equation is simply the variables themselves plus the measurement uncertainty modeled as Gaussian white noise. The observation matrix is simply an identity matrix.

A problem exists when the left bound or right bound, or both, of a potential threat are outside of the camera's field of view. In such cases the potential threat bounds can not be directly measured from the stereo depth map. In such situations a very large variance is assign for the observation noise to reflect the uncertainty in the measurement. Experiments show that Kalman filtering propagates the uncertainty quite well. Kalman filtering is particularly helpful when a potential threat is very close and fully occupies the field of view. If the observations of bound positions and velocity become highly uncertain the collision detection system 102 relies on a previously estimated system model.

While the foregoing is directed to embodiments of the present invention, other and further embodiments of the invention may be devised without departing from the basic scope thereof, and the scope thereof is determined by the claims that follow.

The invention claimed is:

1. A computer implemented method of detecting an imminent collision comprising the steps of:
    capturing and preprocessing imagery of a scene proximate a platform using an image processor;
    producing from the imagery a depth map using the image processor, wherein each pixel in the depth map has associated 3D position data;
    performing by the image processor the steps of tessellating the depth map into a number of patches and selecting a plurality of the patches of the depth map for processing, wherein said
    processing comprise fitting a plane to each patch of said selected plurality the patches, obtaining a normal vector to each said plane, and classifying the selected plurality of patches of the depth map into a plurality of classes based on the obtained normal vector for each said selected patch and on said 3D position data; and
    detecting a potential threat in the tessellated depth map during the processing of the selected plurality of the patches.

2. The method of claim 1, further comprising:
    estimating position of the detected potential threat;
    estimating velocity of the detected potential threat;
    filtering the estimated position and filtering the estimated velocity;
    performing a trajectory analysis of the detected potential threat using the filtered estimated position and the filtered estimated velocity; and
    performing a collision prediction based on the trajectory analysis.

3. The method of claim 2, further comprising:
    estimating size of the detected potential threat; and
    determining if a collision is imminent based on the collision prediction and on the estimated size of the potential threat.

4. The method of claim 2 wherein the filtering includes Kalman filtering.

5. The method of claim 2 wherein estimating the velocity of the detected potential threat includes the step of identifying 2D feature correspondences from imagery produced in different time frames.

6. The method of claim 5 wherein estimating the velocity of the detected potential threat further includes the step of obtaining 3D correspondences from the 2D feature correspondences and from the depth map.

7. The method of claim 6 wherein estimating the velocity of the detected potential threat further includes the step of estimating velocity using Random Sample Consensus.

8. The method of claim 1
    said plurality of classes comprise one class representing the patches that are likely to represent a potential threat, another class representing the patches that possibly represent a potential threat, and another class representing the patches that are unlikely to represent a potential threat.

9. The method of claim 8 further including the step of grouping patches that are likely to represent a potential threat together.

10. The method of claim 9 further including the step of creating a bounding box that represents a potential threat, wherein the bounding box is created in accord with the grouping of patches.

11. The method of claim 8 wherein detecting a potential threat in the tessellated depth map includes the steps of moving each patch after local tessellation to find the region of maximum depth map data density near the original patch location, of discarding a patch if the region of maximum depth map data density does not meet a predetermined criterion, and adding the patch to the plurality of the patches if the patch density meets the predetermined criterion.

12. The method of claim 1 wherein obtaining a normal vector includes the steps of calculating the third Eigen-vector of a matrix of patch values using a singular valued decomposition of the matrix, and then estimating the normal vector as the third Eigen-vector.

13. A collision detection system, comprising:
    an imaging device for providing imagery of a scene proximate a platform;
    an image preprocessor for preprocessing said imagery;
    a depth map generator for producing a depth map from said preprocessed imagery wherein each pixel in the depth map has associated 3D position data; and
    a collision detector for tessellating the depth map into a number of patches, selecting a plurality of the patches of the depth map for processing, wherein said processing comprise fitting a plane to each patch of said selected plurality of the patches, obtaining a normal vector to each said plane, and classifying the selected plurality of patches of the depth map into a plurality of classes based on the obtained normal vector for each said selected patch and on said 3D position data; and detecting a potential threat in said tessellated depth map during the processing of the selected plurality of the patches.

14. The system of claim 13, wherein said collision detector estimates position and velocity of said detected potential threat; said collision detector includes a filter for filtering image noise and outliers from said estimated position and from said estimated velocity; said collision detector performs a trajectory analysis of said detected potential threat using said estimated position and said estimated velocity; said collision detector predicts a collision based on said trajectory analysis.

15. The system of claim 14 wherein said collision detector estimates said velocity by identifying 2D feature correspondences from imagery produced in different time frames.

16. The system of claim 13, further including a host vehicle, wherein said image preprocessor comprises a stereo image preprocessor and said imaging device comprises a stereo camera pair mounted in fixed locations relative to said host vehicle.

17. The system of claim 13
wherein said plurality of classes comprise as likely to represent a potential threat, as possibly representing a potential threat, or as being unlikely to represent a potential threat; and
said collision detector detects the potential threat by grouping patches that are likely to represent a potential threat together; and forming a bounding box around said potential threat based on said patch groupings.

18. The system of claim 17 wherein said collision detector detects the potential threat by moving each patch after local tessellation to find the region of maximum depth map data density near the original patch location, discarding said patch if the region of maximum depth map data density does not meet a predetermined criterion, and adding said patch to said plurality of patches if said patch density meets said predetermined criterion.

19. The system of claim 13 wherein obtaining normal vectors includes the steps of calculating for each patch a third Eigen-vector of a matrix of patch values using a singular valued decomposition of said matrix, and then estimating said normal vector as said third Eigen-vector.

20. A computer readable medium having stored thereon a plurality of instructions, the plurality of instruction including instructions which, when executed by a processor causes the processor to perform the steps comprising:
capturing and preprocessing an imagery of a scene proximate a platform;
producing from the imagery a depth map, wherein each pixel in the depth map has associated 3D position data;
tessellating the depth map into a number of patches and selecting a plurality of the patches of the depth map for processing, wherein said processing comprise fitting a plane to each patch of said selected plurality of patches, obtaining a normal vector to each said plane, and classifying the selected plurality of patches of the depth map into a plurality of classes based on the obtained normal vector for each said selected patch and on said 3D position data;
detecting a potential threat in the tessellated depth map during the processing of the selected plurality of the patches.

21. The computer readable medium of claim 20 that further causes the processor to estimate the size of the detected potential threat; estimate the position of the detected potential threat; estimate the velocity of the detected potential threat; filter the estimated position and the estimated velocity perform a trajectory analysis of the detected potential threat using the estimated position and the estimated velocity; and perform a collision prediction based on the trajectory analysis.

22. The computer readable medium of claim 21 that further causes the processor to estimate the velocity by identifying 2D feature correspondences from imagery produced in different time frames.

23. The computer readable medium of claim 22 that further causes the processor to estimate velocity by obtaining 3D correspondences from the 2D feature correspondences and from the depth map.

24. The computer readable medium of claim 20
wherein said plurality of classes comprise as likely to represent a potential threat, as possibly representing a potential threat, or as being unlikely to represent a potential threat.

25. The computer readable medium of claim 24 that further controls a computer to group patches together that are likely to represent said potential threat.

26. The computer readable medium of claim 25 that further causes the processor to create a bounding box that represents the potential threat, wherein the bounding box is created in accord with the patch groupings.

27. The computer readable medium of claim 20 that further causes the processor to detect a potential threat in said tessellated depth map by the steps of moving each patch after local tessellation to find the region of maximum depth map data density near the original patch location, discarding said patch if the region of maximum depth map data density does not meet a predetermined criterion, and adding said patch to said plurality of patches if said patch density meets said predetermined criterion.

28. The computer readable medium of claim 20 that further causes the processor to obtain normal vectors by the steps of calculating for each patch a third Eigen-vector of a matrix of patch values using a singular valued decomposition of said matrix, and then estimating said normal vector as said third Eigen-vector.

29. The system of claim 15 wherein the collision detector further estimates said velocity by obtaining 3D correspondences from the 2D feature correspondences and from the depth map.

30. The system of claim 14 wherein said collision detector estimates size of said detected potential threat and determines if a collision is imminent based on said collision prediction and on said estimated size.

* * * * *